United States Patent
Nogawa

(10) Patent No.: US 8,340,063 B2
(45) Date of Patent: Dec. 25, 2012

(54) WIRELESS COMMUNICATION DEVICE AND COMPUTER PROGRAM

(75) Inventor: Hideki Nogawa, Nagoya (JP)

(73) Assignee: Brother Kogyo Kabushiki Kaisha, Aichi-ken (JP)

( * ) Notice: Subject to any disclaimer, the term of this patent is extended or adjusted under 35 U.S.C. 154(b) by 282 days.

(21) Appl. No.: 12/877,512

(22) Filed: Sep. 8, 2010

(65) Prior Publication Data

US 2011/0063990 A1    Mar. 17, 2011

(30) Foreign Application Priority Data

Sep. 11, 2009  (JP) ................................. 2009-210885

(51) Int. Cl.
    *H04W 4/00* (2009.01)
(52) U.S. Cl. ....................................................... 370/338
(58) Field of Classification Search ........................ None
    See application file for complete search history.

(56) References Cited

U.S. PATENT DOCUMENTS

| 7,894,800 B2 * | 2/2011 | Ignatin ........................ 455/414.1 |
| 7,970,929 B1 * | 6/2011 | Mahalingaiah ............... 370/331 |
| 8,068,824 B2 * | 11/2011 | Shan et al. ..................... 455/417 |
| 2008/0192715 A1 * | 8/2008 | Sekhar .......................... 370/338 |

FOREIGN PATENT DOCUMENTS

| JP | 2004-7120 | 1/2004 |
| JP | 2008-167149 | 7/2008 |

* cited by examiner

*Primary Examiner* — Anh-Vu Ly

(74) *Attorney, Agent, or Firm* — Scully, Scott, Murphy & Presser, PC

(57) ABSTRACT

A wireless communication device communicable with a first type and a second type of networks based on a first type and a second type wireless setting data respectively, includes: an obtaining section obtaining an identifier of an access point when a detection section detects the disconnection with the second type network through a certain access point; and a trial section trying to connect with the second type network through the certain access point if at least one second type wireless setting data stored in the second storage includes the obtained identifier, and the trial section trying to connect with the first type network through the certain access point any of the second type wireless setting data stored in the second storage does not includes the obtained identifier but the first type wireless setting data stored in the first storage includes the obtained identifier.

13 Claims, 7 Drawing Sheets

WIRELESS COMMUNICATION DEVICE AND COMPUTER PROGRAM

CROSS REFERENCE TO RELATED APPLICATION

The present application claims priority from Japanese Patent Application No. 2009-210885 filed on Sep. 11, 2009, and the entire subject matter of which is incorporated herein by reference.

TECHNICAL FIELD

This specification discloses a wireless communication device which is connected to a wireless network using wireless setting data.

BACKGROUND

For example, there is a related wireless communication device connectable to a wireless LAN. When the connection to one wireless LAN is disconnected, the related wireless communication device is connected to a wireless LAN different from the disconnected wireless LAN.

In the above mentioned related art, only one type of wireless network called a LAN is disclosed. There is no indication of the presence of different types of wireless networks. Exemplary embodiments of the present invention provide an appropriate process for a wireless communication device connectable to a plurality of types of wireless networks. The appropriate process is useful when the connection between the wireless communication device and a wireless network is disconnected.

SUMMARY

The first aspect of the exemplary embodiments of the present invention is a wireless communication device. The wireless communication device is communicable with a first type of wireless network including an access point and communicable with a second type of wireless network including a terminal having an access point function. The wireless communication device includes a communication section and a detection section. The communication section is configured to connect with a wireless network and executes communication with the wireless network. The detection section is configured to detect a disconnection with the wireless network. The wireless communication also includes the first storage and the second storage. The first storage stores first type wireless setting data for the first type of wireless network. The second storage stores second type wireless setting data for the second type of wireless network. The communication section of the communication device includes an obtaining section and a trial section. The obtaining section is configured to obtain an identifier for identifying a wireless network from at least one of a certain access point and a certain terminal device if the detection section detects the disconnection with a specified wireless network and if the specified wireless network is the second type of wireless network. The trial section tries to connect with a wireless network stored in the first or second storage. In a fist case where the second storage stores at least one second type wireless setting data including an identifier that is identical with the obtained identifier, try to connect with the second type of wireless network including the certain terminal device with use of one of the at least one second type wireless setting data, the trial section tries to connect with the second type of wireless network including the certain terminal device with use of one of the at least one second type wireless setting data. In a second case where the second storage does not store second type wireless setting data including an identifier that is identical with the obtained identifier but the first storage stores at least one first type wireless setting data including an identifier that is identical with the obtained identifier, the trial section tries to connect with the first type of wireless network including the certain access point with use of one of the at least one first type wireless setting data.

One situation (hereinafter referred to as "the first situation") where a temporary communication error or the like has occurred in a first terminal device while the wireless communication device is connected to the second type of wireless network. In this situation, the first terminal device functions as an access point for the second network. In the first situation, because of the temporary communication error or the like, the connection between the wireless communication device and the second type of wireless network is disconnected differently from a user's intention. In the first situation, there is a high possibility that the first terminal device may be located near the wireless communication device when the connection has been disconnected, and the wireless communication device can acquire an identifier from the first terminal device. Thus, the wireless communication device can be connected to the second type of wireless network disconnected differently from the user's intention. Another situation (hereinafter referred to as "the second situation") where the user decides not to continue the connection between the wireless communication device and a second terminal device and the user then moves the second terminal device while the wireless communication device is connected to the second type of wireless network through the second terminal device. In this situation, the second terminal device functions as an access point for the second wireless network. In the second situation, because of the user's decision, the connection between the wireless communication device and the second type of wireless network is also disconnected. Since the second terminal device is not located near the wireless communication device when the connection is disconnected in the second situation, the wireless communication device is incapable of acquiring an identifier from the second terminal device. Accordingly, the wireless communication device does not try to establish the connection between the wireless communication device and the second type of wireless network, which is unnecessary for the user. Furthermore, when an access point for the first type of wireless network is located near the wireless communication device in the second situation, the wireless communication device can acquire an identifier from the access point for the first type of wireless network. Thus, the wireless communication device can be connected to the first type of wireless network through the access point of the acquired identifier.

The wireless communication device may further include a determination section. The determination section is configured to determine whether the specified wireless network is the first type of wireless network or the second type of wireless network if the detection section detects the disconnection with the specified wireless network.

The determination section may determine that the specified network is the second type of wireless network, if a probe response signal, which is received when the wireless communication device previously connects with the specified wireless network, includes a predetermined information indicating the second type network. Also, the determination section may determine that the specified network is the first type of wireless network, if the probe response signal, which is received when the wireless communication device previously connects with the specified wireless network, does not include the predetermined information.

The second type wireless setting data, which is used for the above described trial to connect with the second type of wireless network including the specified terminal device, may be the one of the at least one second wireless setting data which is used for the last connection precedent to the detected disconnection.

The obtaining section may obtain the identifier from each of the plurality of the terminal devices each including the certain terminal device. In this case, if the second storage stores two or more second type wireless setting data and the two or more second type wireless setting data includes a specified second type wireless setting data used for the last connection preceded to the detected disconnection in the first case, the trial section selects the specified second type wireless setting data from the two or more of the second type wireless setting data and tries to connect the second type of wireless network, which is under the detected disconnection, with use of the selected specified second type wireless setting data.

In the above described first situation, if there are a plurality of terminal devices in the vicinity of the wireless communication device, the wireless communication device may obtain the identifier from each terminal device. If there are a plurality of second type of wireless networks including the terminal device from each of which the communication device obtains identifier, the wireless communication device is able to reconnect the second type of wireless network which is disconnected opposite to the intention of the user.

If the second storage does not store a specified second type wireless setting data used for the last connection precedent to the detected disconnection in the first case, the trial section tries to connect another second type of wireless network, which is different from the second type of wireless network under the detected disconnection, with use of another second type of wireless setting data stored in the second storage. According to this configuration, the wireless communication is able to connect with another second type of wireless network when there is no previously connected second type of wireless network.

If a disconnection with the first type of wireless network is detected, the trial section tries to reconnect the first type of wireless network, which is under the detected disconnection, with use of a specified first type of setting data, which is used for the last connection precedent to the detected disconnection.

According to this configuration, the wireless communication device is able to reconnect with the first type of wireless network when the connection to the first type of wireless network has been disconnected.

A control method and a computer program for implementing the above-described wireless communication device are also newly useful. A system including the wireless communication device, the first type of wireless network, and the second type of wireless network described above is also newly useful.

EXEMPLARY EMBODIMENTS

First Embodiment
(Configuration of Wireless Communication System 2)

Figure 1:
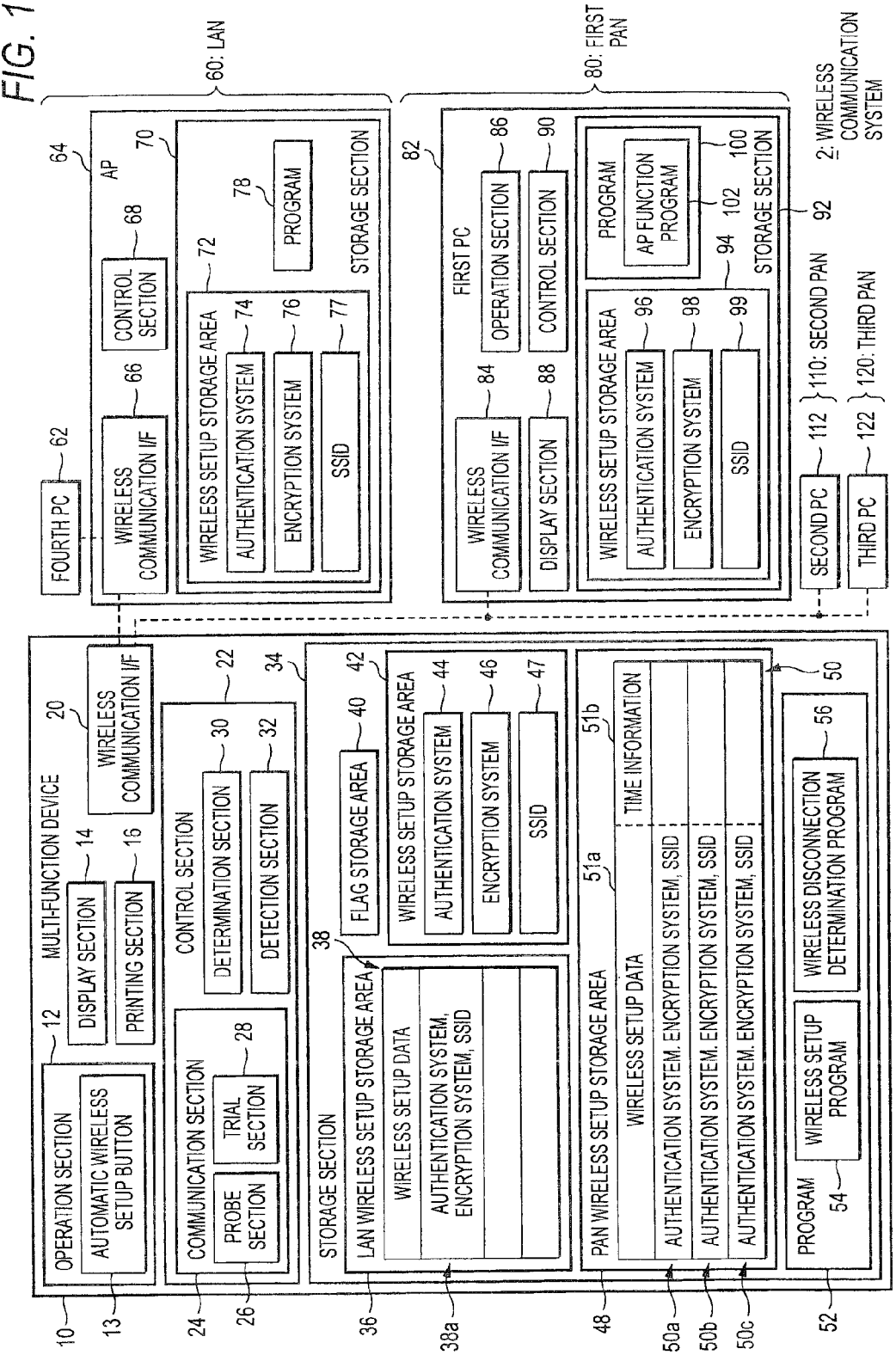
FIG. 1 shows an example of the configuration of a multi-function device.

The first exemplary embodiment will be described with reference to the drawings. FIG. 1 shows the configuration of the wireless communication system 2 of the first exemplary embodiment. The wireless communication system 2 includes a multi-function device 10, a LAN (Local Area Network) 60, a first PAN (Personal Area Network) 80, a second PAN 110, and a third PAN 120. The multi-function device 10 is connectable to the LAN 60, the first PAN 80, the second PAN 110, and the third PAN 120.

(Configuration of Multi-Function Device 10)

The multi-function device 10 includes an operation section 12, a display section 14, a printing section 16, a wireless communication interface (referred to as "wireless communication I/F" in the figure and hereinafter) 20, a control section 22, a storage section 34, and the like. The operation section 12 includes a plurality of buttons to be operated by a user. The operation section 12 includes an automatic wireless setup button 13. The automatic wireless setup button 13 is a button for setting wireless setting data (an authentication system 44 and an encryption system 46 to be described later) in the multi-function device 10 according to an automatic wireless setup mode. A manual wireless setup mode exists as a concept as opposed to the automatic wireless setup mode. When the manual wireless setup mode is used, it is necessary for the user to input wireless setting data to be set in the multi-function device 10 by operating the operation section 12. For example, it is necessary for the user to select one type authentication system from among a plurality of types of authentication systems and further select one type encryption system from among a plurality of types of encryption systems. Wireless setting data can be set in the multi-function device 10 as the user executes a simple operation when the automatic wireless setup mode is used.

The display section 14 displays various types of information. The printing section 16 prints the print data from an outside source, or the scan data generated by a scanner section (not shown) provided in the multi-function device 10, on a print medium.

The wireless communication I/F 20 is an interface for wirelessly communicating with external devices (for example, an access point (referred to as "AP" in the figure and hereinafter) 64 and PCs 82, 112, and 122). In FIG. 1, the dotted line between the wireless communication I/F 20 and a wireless communication I/F 66 of the AP 64 indicates that wireless communication is possible between the multi-function device 10 and the AP 64. The other dotted lines of FIG. 1 also indicate that two devices are wirelessly communicable.

The storage section 34 includes a LAN wireless setup storage area 36, a PAN wireless setup storage area 48, a flag storage area 40, and a wireless setup storage area 42. The wireless setup storage area 42 is a storage area for storing wireless setting data (the authentication system 44, the encryption system 46, and an SSID (Service Set Identifier)

47) to be used when the multi-function device 10 wirelessly communicates with a device included in the wireless network.

The LAN wireless setup storage area 36 is a storage area for storing wireless setting data 38 used by a previously connected LAN (for example, the LAN 60). The LAN wireless setup storage area 36 stores a LAN wireless setting data list 38 capable of registering a plurality of wireless setting data 38a. Each wireless setting data 38a includes an authentication system, an encryption system, and an SSID.

The PAN wireless setup storage area 48 is a storage area for storing wireless setting data used by previously connected PANs (for example, the PANs 80, 110, and 120). The PAN wireless setup storage area 48 stores a PAN wireless setting data list 50 capable of registering a plurality of pieces of combination information 50a, 50b, and 50c. In the PAN wireless setting data list 50, the combination information 50a, 50b, and 50c is information in which wireless setting data 51a is associated with time information 51b.

The wireless setting data 51a includes an authentication system, an encryption system, and an SSID. The time information 51b is used in a second embodiment to be described later. That is, the PAN wireless setting data list 50 of the first embodiment may or may not include the time information 51b.

The flag storage area 40 stores the ON or OFF of a connection flag. The storage section 16 stores a program 52. The program 52 includes a basic function program for executing a basic function of the multi-function device 10 such as a printing process or a displaying process, a wireless setup program 54, a wireless disconnection determination program 56, and the like.

The control section 22 is constituted by a CPU (not shown). The control section 22 executes various processes according to the program 52 stored in the storage section 16. As the control section 22 executes a process according to the program 52, the functions of the communication section 24 (an obtaining section 26 and a trial section 28), a determination section 30, and a detection section 32 are implemented.

(Configuration of LAN 60)

Subsequently, the configuration of the LAN 60 will be described in detail. The LAN 60 is a wireless network constituted by the AP function that the AP 64 exhibits. The LAN 60 includes the AP 64, a fourth PC 62, and the like. In the LAN 60, a plurality of devices including the fourth PC 62 (only the fourth PC 62 is shown in FIG. 1) is connected to be wirelessly communicable with the AP 64. The plurality of devices including the fourth PC 62 is mutually wirelessly communicable via the AP 64.

The AP 64 includes a wireless communication I/F 66, a control section 68, a storage section 70, and the like. The wireless communication I/F 66 is an interface for wirelessly communicating with external devices (for example, the multi-function device 10 and the fourth PC 62). The control section 68 is constituted by a CPU (not shown). The control section 68 executes various processes according to a program 78 (for example, an AP function program or the like) stored in the storage section 70. The storage section 70 includes a wireless setup storage area 72. The wireless setup storage area 72 stores wireless setting data (an authentication system 74, an encryption system 76, and an SSID 77) for wirelessly communicating with a device (for example, the fourth PC 62) included in the LAN 60. The SSID 77 is an identifier for identifying the LAN 60. The storage section 70 stores the program 78. The program 78 includes an AP function program for enabling the AP 64 to execute the AP function.

(Configuration of First PAN 80)

Subsequently, the configuration of the first PAN 80 will be described in detail. The first PAN 80 is a wireless personal area network constituted by the AP function that the first PC 82 exhibits. The first PAN 80 includes the first PC 82. The first PC 82 is a portable PC. In the first PAN 80, for example, one device (for example, the multi-function device 10) other than the first PC 82 is wirelessly communicable with the first PC 82 as the AP. In this case, the device and the first PC 82 are mutually wireless communicable. In the first PAN 80, for example, a plurality of devices other than the first PC 82 is connected to be wirelessly communicable with the first PC 82 as the AP. In this case, the plurality of devices described above is mutually wirelessly communicable via the AP provided in the first PC 82.

The first PC 82 includes a wireless communication I/F 84, an operation section 86, a display section 88, a control section 90, a storage section 92, and the like. The wireless communication I/F 84 is an interface for wirelessly communicating with an external device (for example, the multi-function device 10). The operation section 86 is constituted by a mouse and a keyboard. The display section 88 displays various types of information. The control section 90 is constituted by a CPU (not shown). The control section 90 executes various processes according to a program 100 (for example, an AP function program 102 or the like) stored in the storage section 92. The storage section 92 includes a wireless setup storage area 94. The wireless setup storage area 94 is a storage area for storing wireless setting data (an authentication system 96, an encryption system 98, and an SSID 99) for wirelessly communicating with a device included in the first PAN 80. The SSID 99 is an identifier for identifying the first PAN 80. The storage section 92 stores the program 100. The program 100 includes the AP function program 102 for enabling the first PC 82 to execute the AP function.

The AP function program 102 includes the function of My WiFi Technology proposed by Intel (registered trademark). The first PAN 80 is different from Bluetooth (registered trademark). The first PAN 80 is used for wireless communication to be performed on the basis of IEEE 802.11, while Bluetooth (registered trademark) is used for wireless communication to be performed on the basis of IEEE 802.15. When the first PC 82 exhibits the AP function, a plurality of devices included in the first PAN 80 can perform communication via the first PC 82 (the AP of the first PC 82). On the other hand, a plurality of devices may not perform communication via another device in Bluetooth (registered trademark).

(Configuration of Second PAN 110)

The second PAN 110 is a wireless personal area network constituted by the AP function that the second PC 112 exhibits. The second PAN 110 includes the second PC 112. In the second PAN 110, for example, one device (for example, the multi-function device 10) other than the second PC 112 is connected to be wirelessly communicable with the second PC 112 as the AP. The second PC 112 has the same configuration as the first PC 82. An SSID for identifying the second PAN 110 is stored in the storage section of the second PC 112. This SSID is different from the SSID 99 of the first PAN 80.

(Configuration of Third PAN 120)

The third PAN 120 is a wireless personal area network constituted by the AP function that the third PC 122 exhibits. The third PAN 120 includes the third PC 122. In the third PAN 120, for example, one device (for example, the multi-function device 10) other than the third PC 122 is connected to be wirelessly communicable with the third PC 122 as the AP. The third PC 122 has the same configuration as the first PC 82. An SSID for identifying the third PAN 120 is stored in the storage section of the third PC 122. This SSID is different from the SSID 99 of the first PAN 80, and is different from the SSID of the second PAN 110.

(Process to be Executed by Each Device)

Figure 2:
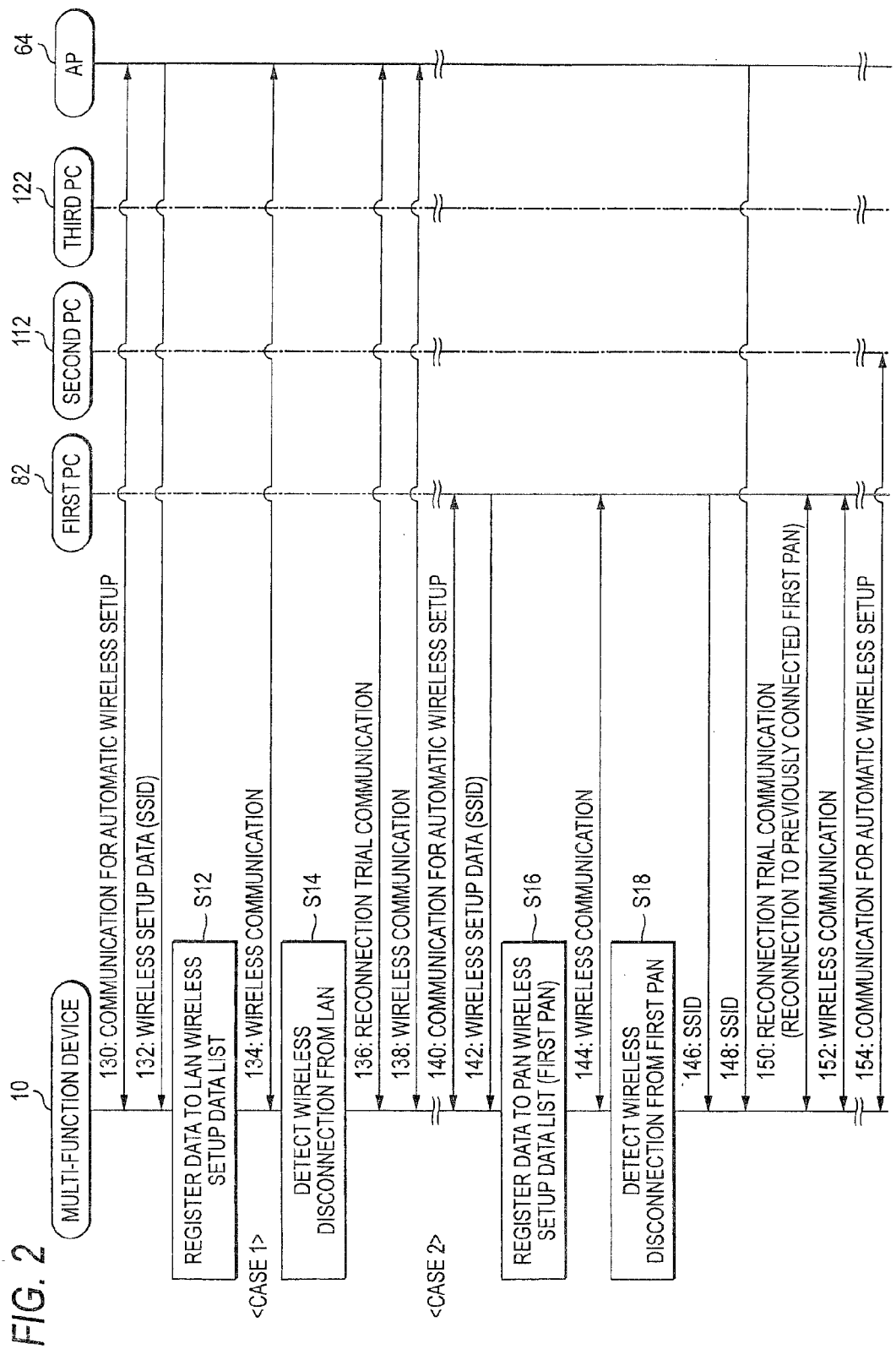
FIG. 2 shows a sequence diagram of a process to be executed by each device.
Figure 3:
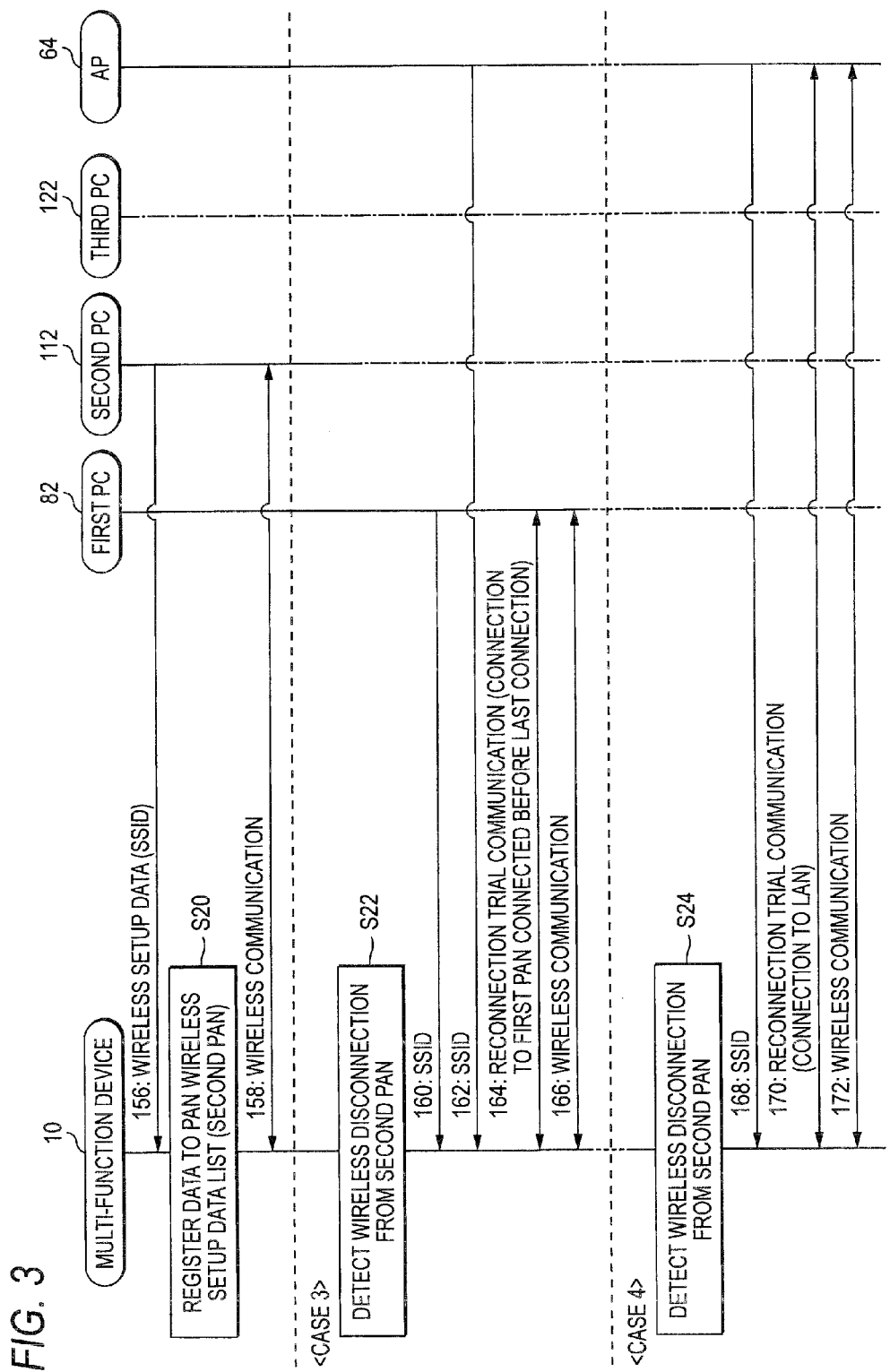
FIG. 3 shows a continuation sequence diagram of FIG. 2.

The outline of a process to be executed by each of the devices 10, 64, 82, 112, and 122 will be described with reference to FIGS. 2 and 3. In FIGS. 2 and 3, when the devices 82, 112, and 122 are indicated by the solid line, the devices are located in positions where the wireless communication with the multi-function device 10 is possible. When the devices 82, 112, and 122 are indicated by the dashed dotted line, the devices are not located in positions where the wireless communication with the multi-function device 10 is possible. In the first embodiment and the second embodiment to be described later, the AP 64 and the multi-function device 10 are fixedly located, and the AP 64 is located in a position where the wireless communication with the multi-function device 10 is possible. For example, the multi-function device 10 and the AP 64 may be installed in a conference room. Thus, the AP 64 is located in a position where the wireless communication with the multi-function device 10 is constantly possible as indicated by the solid line. On the other hand, the user may bring each of the PCs 82, 112, and 122 as the portable PC in the conference room or may take out each of the PCs 82, 112, and 122 from the conference room. When each of the PCs 82, 112, and 122 is brought in the conference room, each of the PCs 82, 112, and 122 is located in a position where the wireless communication with the multi-function device 10 is constantly possible as indicated by the solid line. On the other hand, when each of the PCs 82, 112, and 122 is not brought in the conference room or is taken out from the conference room, each of the PCs 82, 112, and 122 is not located in a position where the wireless communication with the multi-function device 10 is possible.

When the user desires to connect the multi-function device 10 to the LAN 60, the user operates the automatic wireless setup button 13 and operates a predetermined button (not shown) of the AP 64. When the above-described predetermined button is operated, the AP 64 transmits a beacon signal toward a predetermined range around the AP 64. As a result, the multi-function device 10 receives the beacon signal from the AP 64. When the beacon signal is received from the AP 64, the multi-function device 10 performs communication 130 for automatic wireless setup with the AP 64. In the communication 130 for automatic wireless setup, WPS (Wi-Fi Protected Setup) as a type automatic wireless setup mode is used. In this embodiment, a WPS push button system is used. The following communications 140, 154, and 184 for automatic wireless setup are also the same. The communication 130 for automatic wireless setup includes a process in which the AP 64 receives a probe request transmitted from the multi-function device 10, a process in which the multi-function device 10 receives a probe response transmitted from the AP 64, and the like. The multi-function device 10 analyzes the probe response. Specifically, the multi-function device 10 checks whether or not predetermined information indicating that a transmission source of the probe response corresponds to My WiFi Technology is included in the probe response. Here, the transmission source of the probe response is the AP 64, and the AP 64 does not correspond to My WiFi Technology. Accordingly, the above-described predetermined information is not included in the probe response. Since the above-described predetermined information is not included in the probe response, the multi-function device 10 determines that the wireless network to be connected is the LAN 60.

The AP 64 transmits wireless setting data 132 to the multi-function device 10. The wireless setting data 132 includes the authentication system 74, the encryption system 76, and the SSID 77 stored in the storage section 70 of the AP 64 in advance. The multi-function device 10 stores the wireless setting data 132 in the LAN wireless setting data list 38 (S12). When other wireless setting data is registered to the LAN wireless setting data list 38 prior to the transmission of the wireless setting data 132, the multi-function device 10 adds and registers new wireless setting data 132 to the LAN wireless setting data list 38 without deleting the pre-registered wireless setting data. The multi-function device 10 also stores the wireless setting data 132 in the wireless setup storage area 42. When other wireless setting data is stored in the wireless setup storage area 42 prior to the transmission of the wireless setting data 132, the multi-function device 10 deletes the wireless setting data and stores the new wireless setting data 132. That is, only one of wireless setting data is stored in the wireless setup storage area 42. The multi-function device 10 is connectable to the LAN 60 based on the wireless setting data 132 stored in the wireless setup storage area 42. To establish the connection to the LAN 60, the multi-function device 10 first reads the wireless setting data 132 from the wireless setup storage area 42. Next, the multi-function device 10 transmits a first signal to the AP 64 using the wireless setting data 132. For example, the multi-function device 10 transmits a first signal including information encrypted by an encryption system included in the wireless setting data 132. In response to the first signal, the AP 64 transmits a second signal. The multi-function device 10 is connected to the LAN 60 as at least the first and second signals are transmitted between the multi-function device 10 and the AP 64. While the multi-function device 10 has been connected to the LAN 60, the multi-function device 10 can perform the wireless communication of various data (print data, scan data, and the like) with a device (for example, the fourth PC 62) included in the LAN 60 (see wireless communication 134). For example, the fourth PC 62 can provide the multi-function device 10 with data to be printed by the multi-function device 10 using the wireless communication 134 through the AP 64. For example, the multi-function device 10 can transmit its own generated scan data to the fourth PC 62 using the wireless communication 134 through the AP 64. In the wireless communication 134, data is encrypted according to the wireless setting data 132.

Hereinafter, cases 1 to 4 will be sequentially described. In the case 1, the multi-function device 10 is connected to the LAN 60. In this situation, when a temporary communication error has occurred in the AP 64, the connection of the multi-function device 10 and the LAN 60 is disconnected. The multi-function device 10 detects that the connection to the AP 64 has been disconnected (S14). The multi-function device 10 performs communication 136 (communication of the first and second signals described above) for trying to establish the reconnection to the LAN 60 using the wireless setting data 132 stored in the wireless setup storage area 42. Thereby, the multi-function device 10 is reconnected to the LAN 60 (wireless communication 138).

Next, the case 2 will be described. The case 2 is executed subsequent to the case 1. In the case 2 the first PC 82 is located in a position where communication with the multi-function device 10 is possible as a user of the first PC 82 moves the first PC 82 around the multi-function device 10. To connect the multi-function device 10 to the first PAN 80, the user operates the automatic wireless setup button 13 and performs a predetermined operation on the operation section 86 of the first PC 82. When the above-described operation has been performed, the first PC 82 transmits a beacon signal toward a predetermined range around the first PC 82. When the multi-function device 10 receives the beacon signal transmitted from the first PC 82, the multi-function device 10 performs communication 140 for automatic wireless setup with the first PC 82. The communication 140 for automatic wireless setup includes a process in which the first PC 82 receives a probe request transmitted from the multi-function device 10, a process in which the multi-function device 10 receives a probe response transmitted from the first PC 82, and the like. As described above, the multi-function device 10 analyzes the probe response. Here, the transmission source of the probe response is the first PC 82, and the first PC 82 corresponds to My WiFi Technology. Accordingly, the above-described predetermined information is included in the probe response. Thus, the multi-function device 10 determines that the network to be connected is the PAN. Before the above-described communication 140 is performed, the multi-function device 10 executes a disconnection process of disconnecting the connection to the LAN 60. When the disconnection process is executed, the multi-function device 10 does not execute the communication 136 for trying to establish the reconnection to the LAN 60.

The first PC 82 transmits wireless setting data 142 to the multi-function device 10. The wireless setting data 142 includes the authentication system 96, the encryption system 98, and the SSID 99 stored in the storage section 92 of the first PC 82 in advance. The multi-function device 10 stores the wireless setting data 142 in the PAN wireless setting data list 50 (S16). When other wireless setting data is registered to the PAN wireless setting data list 50 prior to the transmission of the wireless setting data 142, the multi-function device 10 adds and registers new wireless setting data 142 to the PAN wireless setting data list 50 without deleting the pre-registered wireless setting data. While the wireless setting data 142 is stored in the wireless setup storage area 42, the multi-function device 10 can be connected to the first PAN 80 using the wireless setting data 142 of the wireless storage area 42. The multi-function device 10 is connected to the first PAN 80 by executing the same process as when the connection to the LAN 60 is established. That is, the multi-function device 10 executes communication of the above-described first and second signals with the first PC 82 using the wireless setting data 142. In a state in which the multi-function device 10 is connected to the first PAN 80, the multi-function device 10 can perform the wireless communication of various data (print data, scan data, and the like) with a device (for example, the first PC 82) included in the first PAN 80 (see wireless communication 144). In the wireless communication 144, data is encrypted according to the wireless setting data 142.

When a temporary communication error or the like has occurred in the first PC 82 which functions as the AP while the multi-function device 10 and the first PAN 80 connected, the connection of the multi-function device 10 and the first PAN 80 is disconnected. The multi-function device 10 detects that the connection to the first PAN 80 has been disconnected (S18). The multi-function device 10 acquires SSIDs from APs (for example, the AP 64 and the first PC 82) located around the multi-function device 10. Specifically, the multi-function device 10 transmits an SSID transmission request signal toward a predetermined range around the multi-function device 10. The APs receiving the signal transmit SSIDs to the multi-function device 10. In the case 2, the multi-function device 10 acquires the SSIDs 146 and 148 from the AP 64 and the first PC 82 currently located around the multi-function device 10. The multi-function device 10 executes a determination process of determining whether or not wireless setting data including the same SSIDs as the SSIDs 146 and 148 are registered to the PAN wireless setting data list 50. In S16 described above, the wireless setting data 142 including the SSID 146 of the first PAN 80 is registered to the PAN wireless setting data list 50. Accordingly, the multi-function device 10 determines that the result of the above-described determination process is positive. Next, the multi-function device 10 reads the wireless setting data 142 including the SSID 146 of the first PAN 80 from the PAN wireless setting data list 50. The multi-function device 10 stores (overwrites) the read wireless setting data 142 in the wireless setup storage area 42. Subsequently, the multi-function device 10 performs communication 150 (communication of the above-described first and second signals) for trying to establish the reconnection to the first PAN 80 based on the wireless setting data 142 stored in the wireless setup storage area 42. That is, the multi-function device 10 executes a trial process for establishing the reconnection to the first PAN 80 based on the wireless setting data 142 used for the previous connection precedent to the disconnection. Thereby, the multi-function device 10 is reconnected to the first PAN 80 (wireless communication 152).

Thereafter, the second PC 112 is located in a position where the wireless communication with the multi-function device 10 is possible as a user of the second PC 112 moves the second PC 112 around the multi-function device 10. To connect the multi-function device 10 to the second PAN 110, the user operates the automatic wireless setup button 13 and performs a predetermined operation on the operation section of the second PC 112. Consequently, when the second PC 112 transmits a beacon signal and the multi-function device 10 receives the beacon signal, the multi-function device 10 performs communication 154 for automatic wireless setup with the second PC 112. The communication 154 for automatic wireless setup is the same as the above-described communication 140. The multi-function device 10 analyzes a probe response received during the communication 154, and determines that the wireless network to be connected is the PAN. Before the above-described communication 154 is performed, the multi-function device 10 executes a disconnection process of disconnecting the connection to the first PAN 80. When the disconnection process is executed, the multi-function device 10 does not execute the transmission of the SSID transmission request signal and the communication 150 for trying to establish the reconnection to the first PAN 80.

As shown in FIG. 3, the second PC 112 provides the multi-function device 10 with wireless setting data 156 including an authentication system, an encryption system, and an SSID stored in the storage section of the second PC 112 in advance. The multi-function device 10 registers the wireless setting data 156 to the PAN wireless setting data list 50 (S20). Consequently, the wireless setting data 142 for the first PAN 80 and the wireless setting data 156 for the second PAN 110 are registered to the PAN wireless setting data list 50. The multi-function device 10 stores the wireless setting data 156 in the wireless setup storage area 42. The multi-function device 10 is connected to the second PAN 110 by executing the same process as when the connection to the first PAN 80 is established using the wireless setting data 156 of the wireless setup storage area 42. While the multi-function device 10 has been connected to the second PAN 110, the multi-function device 10 can perform the wireless communication of various data (print data, scan data, and the like) with a device (for example, the second PC 112) included in the second PAN 110 (see wireless communication 158).

Subsequently, the cases 3 and 4 will be described. The cases 3 and 4 are respectively executed subsequent to the case 2. The cases 3 and 4 are not temporally continuous. First, the case 3 will be described as a event subsequent to the case 2. In the case 3, the second PC 112 is not located in a position where the wireless communication with the multi-function device 10 is possible as the user moves the second PC 112 to be far away from the multi-function device 10. The first PC 82 is located in a position where the wireless communication with the multi-function device 10 is possible. The multi-function device 10 detects that the connection with the second PAN 110 has been disconnected (S22). The multi-function device 10 transmits an SSID transmission request signal toward a predetermined range around the multi-function device 10, and acquires SSIDs from APs (for example, the AP 64 and the first PC 82). In the case 3, the multi-function device 10 acquires SSIDs 160 and 162 from the AP 64 and the first PC 82 currently located around the multi-function device 10. The multi-function device 10 executes a determination process of determining whether or not wireless setting data including the same SSIDs as the SSIDs 160 and 162 are registered to the PAN wireless setting data list 50. In S16 of FIG. 2 described above, the wireless setting data 142 including the SSID 146 of the first PAN 80 is registered to the PAN wireless setting data list 50. Accordingly, the multi-function device 10 determines that the result of the above-described determination process is positive, reads the wireless setting data 142 from the PAN wireless setting data list 50, and stores the read wireless setting data 142 in the wireless setup storage area 42. Subsequently, the multi-function device 10 performs communication 164 (communication of the above-described first and second signals) for trying to establish the reconnection to the first PAN 80 using the wireless setting data 142 stored in the wireless setup storage area 42. That is, the multi-function device 10 executes a trial process for establishing the reconnection to the previously connected first PAN 80 before the connection to the second PAN 110. Thereby, the multi-function device 10 is reconnected to the first PAN 80 (wireless communication 166).

Next, the case 4 will be described as an event subsequent to the case 2. In the case 4 like the case 3, the second PC 112 is not located in a position where the wireless communication with the multi-function device 10 is possible as the user of the second PC 112 moves the second PC 112 to be far away from the multi-function device 10. In the case 4, the user of the first PC 82 moves the first PC 82 to be far away from the multi-function device 10, and the first PC 82 is also not located in a position where the wireless communication with the multi-function device 10 is possible. The multi-function device 10 detects the disconnection from the second PAN 110 (S24). The multi-function device 10 acquires SSIDs from APs located around the multi-function device 10. In the case 4, the multi-function device 10 acquires an SSID 168 only from the AP 64 currently located around the multi-function device 10. The multi-function device 10 executes a first determination process of determining whether or not wireless setting data including the same SSID 168 is registered to the PAN wireless setting data list 50. The wireless setting data including the SSID 168 of the LAN 60 is not registered to the PAN wireless setting data list 50. Accordingly, the multi-function device 10 determines that the result of the above-described determination process is negative. The multi-function device 10 then executes a second determination process of determining whether or not the wireless setting data including the SSID 168 is registered to the LAN wireless setting data list 38. In S12 of FIG. 2 described above, the wireless setting data 132 including the SSID 168 of the LAN 60 is registered to the LAN wireless setting data list 38. Accordingly, the multi-function device 10 determines that the result of the second determination process is positive. The multi-function device 10 reads the wireless setting data 132 from the LAN wireless setting data list 38, and stores the read wireless setting data 132 in the wireless setup storage area 42. Subsequently, the multi-function device 10 performs communication 170 (communication of the above-described first and second signals) for trying to establish the reconnection to the LAN 60 using the wireless setting data 132 stored in the wireless setup storage area 42. Thereby, the multi-function device 10 is reconnected to the LAN 60 (wireless communication 182).

(Wireless Connection Process by Multi-Function Device 10)

Figure 4:
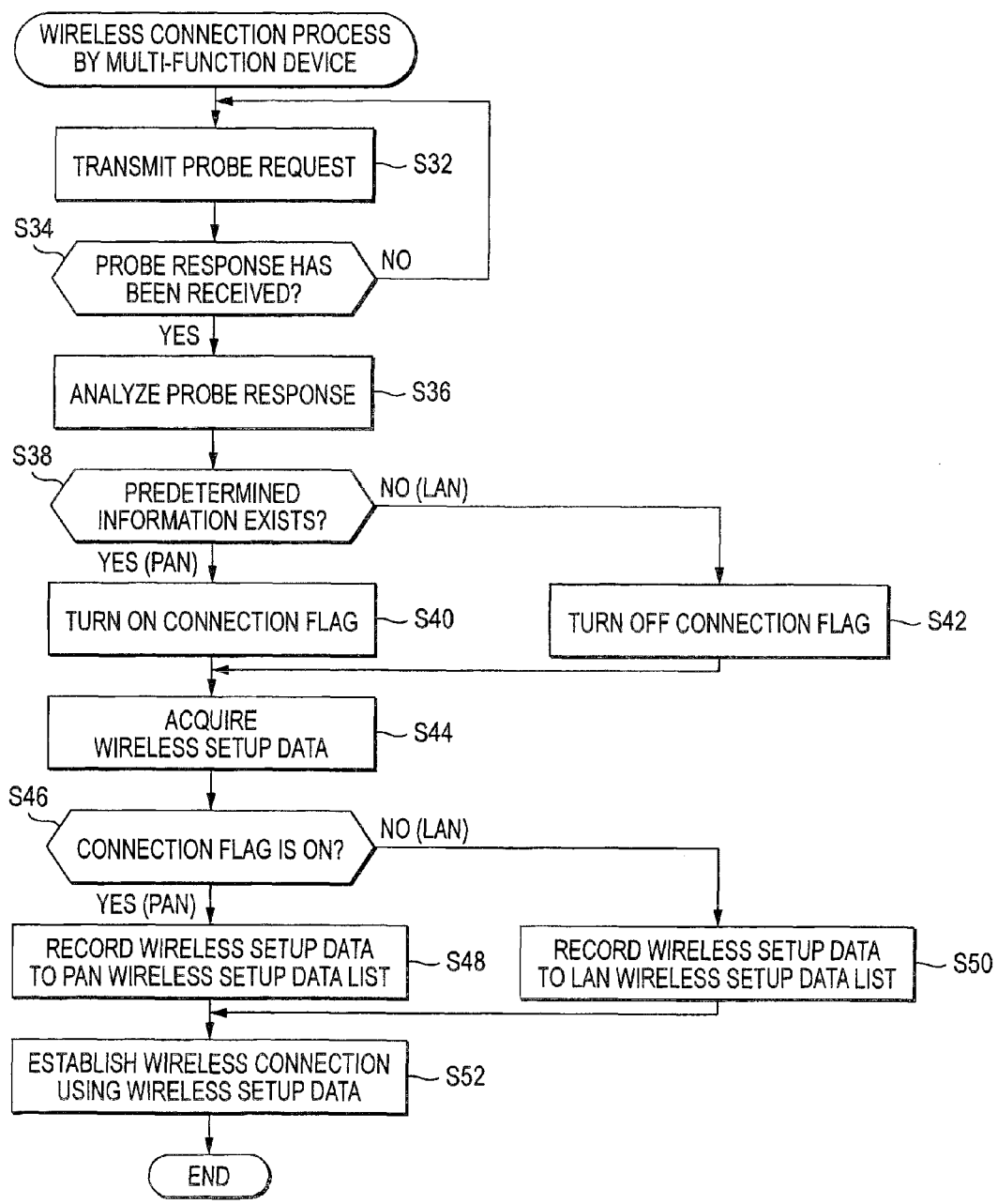
FIG. 4 shows a flowchart of a wireless connection process to be executed by the multi-function device.

Subsequently, a wireless communication process to be executed by the multi-function device 10 in the above-described process will be described in detail. When the multi-function device 10 receives a beacon signal from an external device (for example, one of the devices 64, 82, 112, and 122), the wireless connection process is started. As shown in FIG. 4, the communication section 24 of the multi-function device 10 transmits a probe request to the transmission source of the beacon signal (S32) (communications 130, 140, and 150 of FIG. 2). The communication section 24 monitors the reception of a probe response from a transmission destination of the probe request (S34). In the case of YES in S34, the control section 30 analyzes the received probe response (S36). The determination section 30 determines whether or not predetermined information (information indicating the correspondence to My WiFi Technology) is included in the probe response (S38). In the case of YES in S38, that is, when the wireless network to be connected to the multi-function device 10 is the PAN 80, 110, or 120, the determination section 30 turns on a connection flag stored in the flag storage area 40 (S40). On the other hand, in the case of NO in S38, that is, when the network to be connected to the multi-function device 10 is the LAN 60, the determination section 30 turns off the connection flag stored in the flag storage area 40 (S42).

Next, the communication section 24 acquires wireless setting data (an authentication system, an encryption system, and an SSID) from an external device of the transmission source of the probe response (S44) (the wireless setting data 132, 142, and 156 of FIGS. 2 and 3). Subsequently, the communication section 24 determines whether or not the connection flag stored in the flag storage area 40 is ON (S46). In the case of YES in S46, that is, when the acquired wireless setting data is wireless setting data for the PAN 80, 110, or 120, the communication section 24 registers the acquired wireless setting data of S44 (the wireless setting data 142 and 156 of FIGS. 2 and 3) to the PAN wireless setting data list 50 (S48), and proceeds to S52. On the other hand, in the case of NO in S46, that is, when the acquired wireless setting data is wireless setting data for the LAN 60, the communication section 24 registers the wireless setting data (the wireless setting data 132 of FIG. 2) to the LAN wireless setting data list 38 (S50), and proceeds to S52. The communication section 24 stores the acquired wireless setting data of S44 in the wireless setup storage area 42. In S52, the communication section 24 transmits the above-described first signal to the AP 64, the first PC 82, the second PC 112, or the third PC 122 using the wireless setting data stored in the wireless setup storage area 42. As the communications section 24 receives the above-described second signal, which is a response to the first signal, from the transmission destination of the above-described first signal, the multi-function device 10 is connected to the wireless network 60, 80, 110, or 120. Thereby, the multi-function device 10 can perform the wireless communication (the wireless communication 134, 144, or 158 of FIGS. 2 and 3) with a device included in the wireless network 60, 80, 110, or 120.

(Reconnection Process by Multi-Function Device 10)

Figure 5:
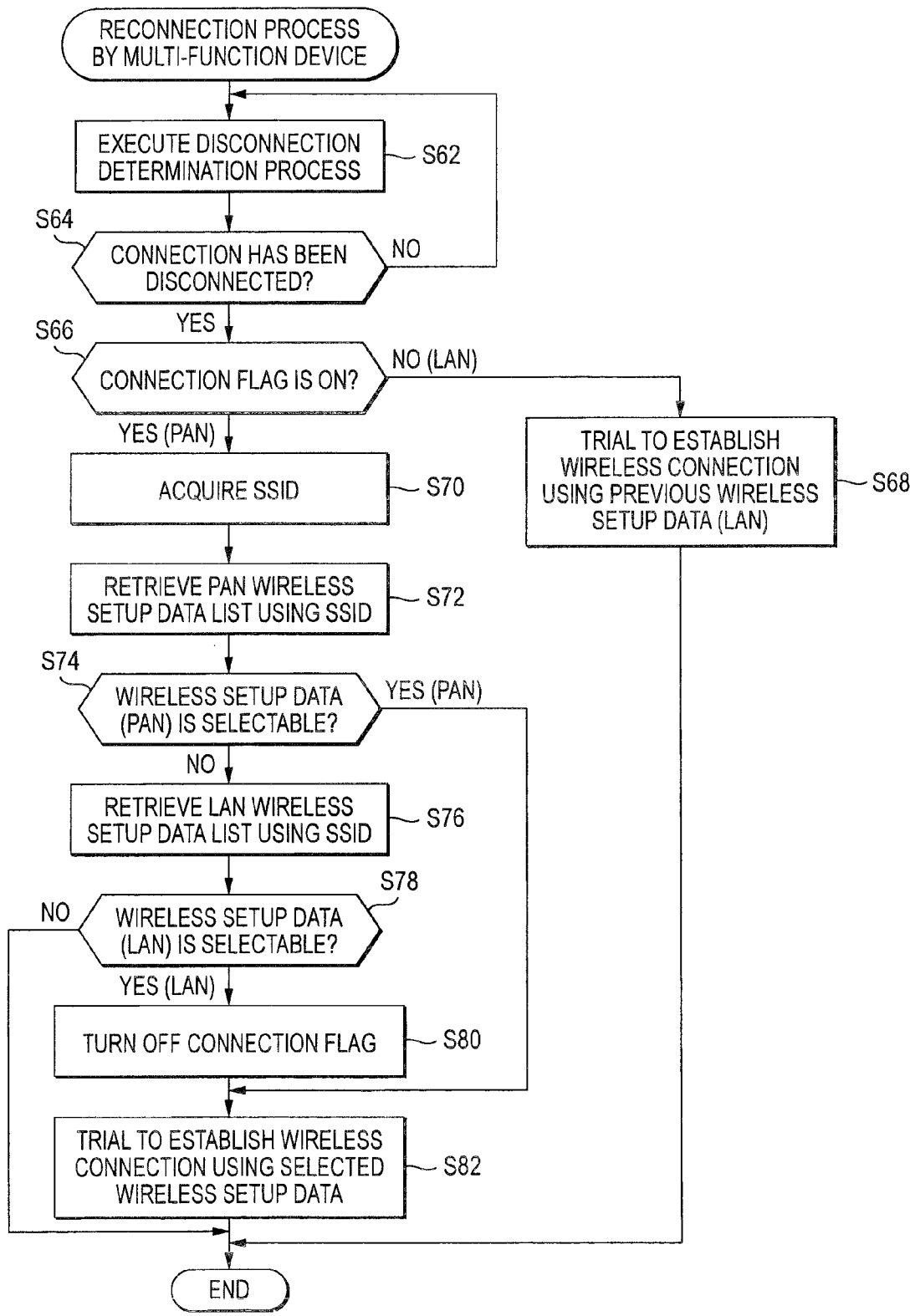
FIG. 5 shows a flowchart of a reconnection process to be executed by a multi-function device of a first embodiment.

Subsequently, a reconnection process to be executed by the multi-function device 10 will be described. As shown in FIG. 5, when the multi-function device 10 is connected to the wireless network, the detection section 32 of the multi-function device 10 executes a process of periodically determining whether or not the connection to the wireless network is established (S62). For example, when the multi-function device 10 is connected to the LAN 60, the detection section 32 periodically transmits a search signal, which searches for the AP 64, to the AP 64. The control section 68 of the AP 64 transmits a response signal to the multi-function device 10 in response to the search signal. When the response signal is received from the AP 64, the detection section 32 of the multi-function device 10 determines that the connection to the LAN 60 is established (NO in S64), and returns to S62.

When no response signal is received even though the search signal is transmitted a predetermined number of times, the detection section 32 determines that the connection has been disconnected (YES in S64). The communication section 24 determines whether or not the connection flag stored in the flag storage area 40 is ON (S66). In the case of NO in S66, that is, when the disconnected wireless network is the LAN 60, the trial section 28 attempts to establish the reconnection to the LAN 60 using the wireless setting data 132 stored in the wireless setup storage area 42 (S68) (reconnection attempt communication 136 of FIG. 2), and ends the process. That is, the trial section 28 attempts to establish the reconnection to the LAN 60 of which the disconnection has been detected using the wireless setting data 132 used for the previous connection. Specifically, the trial section 28 transmits the above-described first signal to the AP 64 using the wireless setting data 132 and ends the process.

On the other hand, in the case of YES in S66, that is, when the disconnected wireless network is the PAN 80, 110, or 120, the obtaining section 26 acquires SSIDs from APs (the AP 64, the first PC 82, and the like) located around the multi-function device 10 (S70) (the SSIDs 146 and 148, the SSID 156, or the SSIDs 160 and 162 of FIGS. 2 and 3). The trial section 28 retrieves whether or not wireless setting data including an SSID matching the acquired SSID is registered to the PAN wireless setting data list 50 (S72). When the wireless setting data including the SSID matching the acquired SSID is registered to the PAN wireless setting data list 50, the trial section 28 selects (reads) the wireless setting data. The trial section 28 determines whether or not the wireless setting data can be selected from the PAN wireless setting data list 50 (S74). In the case of YES in S74, the process proceeds to S82. In the case of NO in S74, the process proceeds to S76. In S76, the trial section 28 retrieves whether or not the wireless setting data including the SSID matching the acquired SSID is registered to the LAN wireless setting data list 38. When the wireless setting data including the SSID matching the acquired SSID is registered to the LAN wireless setting data list 38, the trial section 28 selects (reads) the wireless setting data. The trial section 28 determines whether or not the wireless setting data can be selected from the LAN wireless setting data list 38 (S78). In the case of NO in S78, the process is ended. In the case of YES in S78, the communication section 24 turns off the connection flag (S80), and proceeds to S82. The trial section 28 stores the selected (read) wireless setting data of S74 or S78 in the wireless setup storage area 42. Subsequently, in S82, the trial section 28 attempts to establish the connection using the wireless setting data stored in the wireless setup storage area 42 (S82) (reconnection communications 150, 164, and 170 of FIGS. 2 and 3), and ends the process. Specifically, the trial section 28 transmits the above-described first signal to the AP 64 and the PCs 82, 112, or 122 using the wireless setting data.

The multi-function device 10 of this embodiment has been described in detail. In an environment where the multi-function device 10 is connected to the wireless LAN 60, the multi-function device 10 is generally continuously used within the same LAN 60. In this situation, the connection between the multi-function device 10 and the LAN 60 is disconnected when a temporary communication error has occurred in the AP 64. In this embodiment, when the detected disconnected network is the LAN 60 (NO in S66 of FIG. 5), the multi-function device 10 attempts to establish the reconnection to the LAN 60 (S68 of FIG. 5). Thus, when the communication error of the AP 64 or the like is restored, the multi-function device 10 can be reconnected to the LAN 60.

On the other hand, a user of a portable device like the first PC 82 of this embodiment may temporarily use the multi-function device 10. In this case, the multi-function device 10 is temporarily connected to the first PAN 80 using the AP function of the first PC 82. The user completing the use of the multi-function device 10 may not be necessary to continue the connection to the multi-function device 10. In this case, the user intentionally disconnects the connection of the multi-function device 10 and the first PAN 80 by moving the first PC 82 or turning off the power (hereinafter, this is referred to as the "first disconnection"). On the other hand, when a temporary communication error or the like occurs in the first PC 82 which functions as the AP, the connection of the multi-function device 10 and the first PAN 80 is disconnected differently from the user's intention (hereinafter, this is referred to as the "second disconnection").

When the disconnection from the first PAN 80 is detected, the multi-function device 10 acquires SSIDs (the SSIDs 146 and 148 of FIG. 2) from APs (for example, the AP 64 and the PCs 82, 112, and 122) included in the wireless network located in a position where the wireless connection to the multi-function device 10 is possible. Consequently, in the case of the first disconnection, the multi-function device 10 of this embodiment can be reconnected to the detected disconnected first PAN 80. Before the LAN wireless setting data list 38 is retrieved (S78 of FIGS. 5 and 7), the multi-function device 10 retrieves the PAN wireless setting data list 50 (S74 of FIGS. 5 and 7). Thus, even though the AP 64 acquires the SSID 77 from the AP 64, the multi-function device 10 does not establish the connection to the LAN 60 and can be reconnected to the first PAN 80 disconnected differently from the user's intention.

On the other hand, when the reconnection to the first PAN 80 is not possible in the case of the second disconnection, the connection to the LAN 60 is possible.

Second Embodiment

A difference from the first embodiment will be described. When the multi-function device 10 registers wireless setting data to the PAN wireless setting data list 50 in the second embodiment, combination information 50*a*, 50*b*, and 50*c* of wireless setting data 51*a* and time information 51*b* when the wireless setting data is registered is registered. In S16 of FIG. 2, the multi-function device 10 of the second embodiment registers the combination information 50*a* of the wireless setting data 142 and the time information 51*b* when the wireless setting data 142 is registered to the PAN wireless setting data list 50. Likewise, in S20 of FIG. 3, the combination information 50*b* of the wireless setting data 156 and the time information 51*b* when the wireless setting data 156 is registered is registered to the PAN wireless setting data list 50. When the wireless setting data registered to the PAN wireless setting data list 50 of the multi-function device 10 is read and stored in the wireless setup storage area 42, the multi-function device 10 updates the time information 51b associated with the wireless setting data at the time when the wireless setting data has been read.

(Process to be Executed by Each Device)

Figure 6:
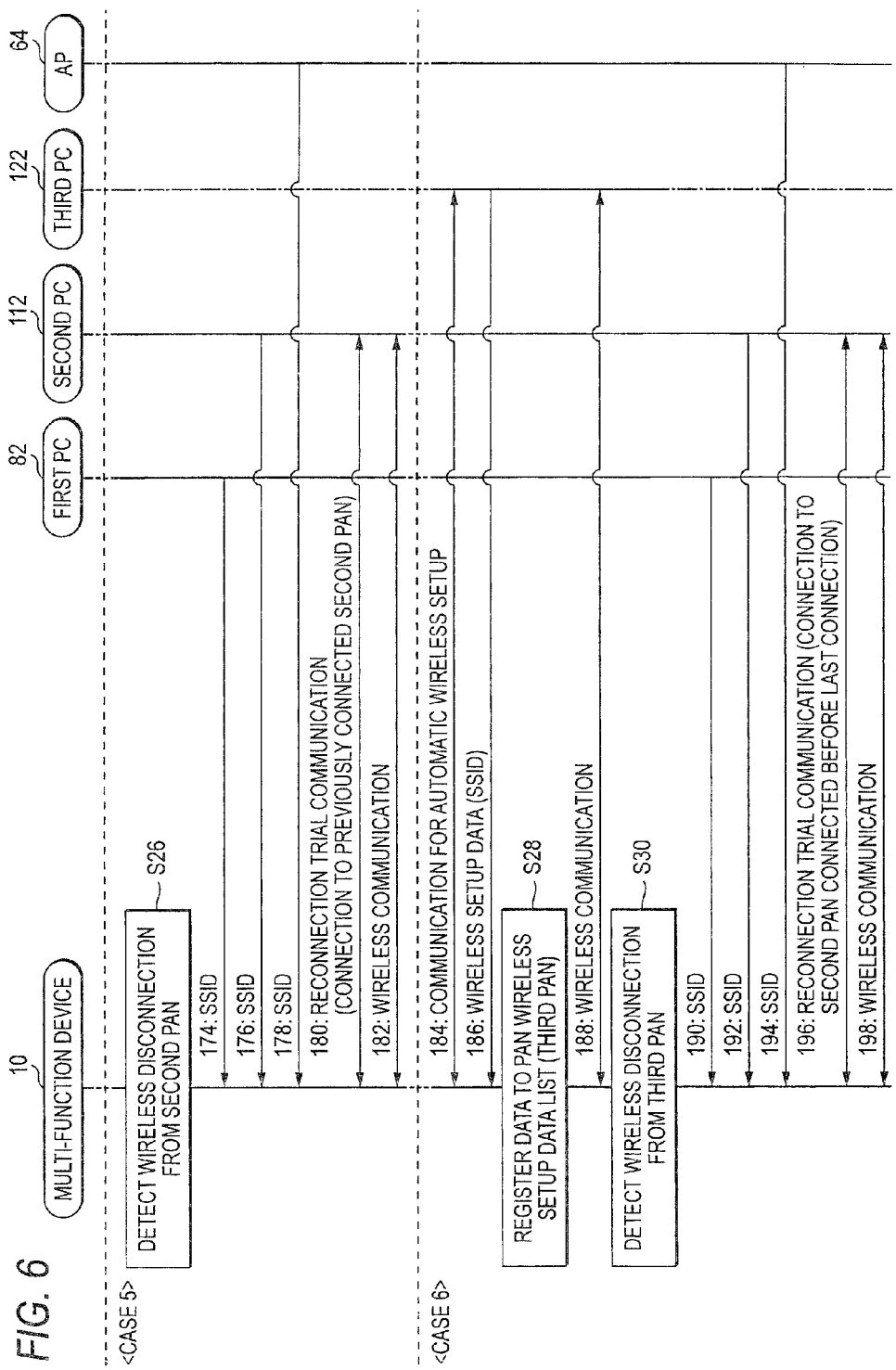
FIG. 6 shows a sequence diagram of a process to be executed by each device of a second embodiment.

The outline of a process to be executed by each of the devices 10, 64, 82, 112, and 122 will be described with reference to FIG. 6. Cases 5 and 6 of FIG. 6 are respectively executed subsequent to the case 2 of FIGS. 2 and 3. The cases 5 and 6 are not temporally continuous.

The case 5 will be described as an event subsequent to the case 2 will be described. In the case 5, the multi-function device 10 detects the disconnection from the second PAN 110 when a temporary communication error or the like has occurred in the first PC 82 which functions as the AP and the connection of the multi-function device 10 and the first PAN 80 has been disconnected (S26). The multi-function device 10 acquires SSIDs from APs located around the multi-function device 10. In the case 5, the multi-function device 10 acquires SSIDs 174, 176, and 178 from the first PC 82, the second PC 112, and the AP 64 located around the multi-function device 10. The multi-function device 10 executes a determination process of determining whether or not wireless setting data including one of the SSIDs 174, 176, and 178 is registered to the PAN wireless setting data list 50. In S16 of FIG. 2 described above, the wireless setting data 142 including the SSID 174 of the first PAN 80 is registered to the PAN wireless setting data list 50. In S20 of FIG. 3 described above, the wireless setting data 156 including the SSID 176 of the second PAN 110 is registered to the PAN wireless setting data list 50. Accordingly, the multi-function device 10 determines that the result of the above-described determination is positive. Next, the multi-function device 10 specifies the wireless setting data 142 and the wireless setting data 156. The multi-function device 10 checks the time information 51b registered to the PAN wireless setting data list 50 in association with each of the wireless setting data 142 and 156. The multi-function device 10 reads the wireless setting data 156 associated with the latest time of the time information 51b, and stores the wireless setting data 156 in the wireless setup storage area 42. At this time, the multi-function device 10 updates the time information 51b registered to the PAN wireless setting data list 50 in association with the wireless setting data 156 to the time at which the wireless setting data 156 has been read. The multi-function device 10 performs communication 180 (communication of the above-described first and second signals) for trying to establish the reconnection to the second PAN 110 using the wireless setting data 156 stored in the wireless setup storage area 42. That is, the multi-function device 10 attempts to establish the connection to the second PAN 110 using the wireless setting data 156 used for the previous connection. The multi-function device 10 is reconnected to the second PAN 110 (wireless communication 182).

Next, the case 6 will be described as an event subsequent to the case 2. In the case 6, the third PC 122 is located in a position where the wireless communication with the multi-function device 10 is possible as the user of the third PC 122 moves the third PC 122 around the multi-function device 10. To connect the multi-function device 10 to the third PAN 120, the user operates the automatic wireless setup button of the multi-function device 10 and performs a predetermined operation on the operation section of the third PC 122. When the third PC 122 transmits a beacon signal and the multi-function device 10 receives the beacon signal, the multi-function device 10 performs communication 184 for automatic wireless setup with the third PC 122. The communication 184 for automatic wireless setup is the same as the above-described communication 140. The multi-function device 10 analyzes a probe response received during the communication 184, and determines that the wireless network to be connected is the PAN. Before the above-described communication 184 is performed, the multi-function device 10 executes a disconnection process of disconnecting the connection to the second PAN 110. When the disconnection process is executed, the multi-function device 10 does not execute the transmission of a SSID transmission request signal and the communication 180 for trying to establish the reconnection to the first PAN 80.

The third PC 122 provides the multi-function device 10 with wireless setting data 186 including an authentication system, an encryption system, and an SSID prestored in the storage section of the third PC 122. The multi-function device 10 registers the wireless setting data 186 to the PAN wireless setting data list 50 (S28). Consequently, the wireless setting data 142, 156, and 186 are registered to the PAN wireless setting data list 50. The multi-function device 10 registers the time at which the wireless setting data 186 has been registered to the time information 51b of the PAN wireless setting data list 50 in association with the wireless setting data 186. The multi-function device 10 stores the wireless setting data 186 in the wireless setup storage area 42. The multi-function device 10 is connected to the third PAN 120 by executing the same process as when the connection to the first PAN 80 is established using the wireless setting data 186 of the wireless setup storage area 42. In a state in which the multi-function device 10 has been connected to the third PAN 120, the multi-function device 10 can perform the wireless communication of various data (print data, scan data, and the like) with a device (for example, the third PC 122) included in the third PAN 120 (see wireless communication 188).

After the multi-function device 10 has been connected to the third PAN 120, the third PC 122 which functions as the AP is moved by the user and is not located in a position where the wireless communication with the multi-function device 10 is possible. Consequently, the connection of the multi-function device 10 and the third PAN 120 is disconnected. The multi-function device 10 detects that the connection to the third PAN 120 has been disconnected (S30). The multi-function device 10 acquires SSIDs from APs located around the multi-function device 10. In the case 6, the multi-function device 10 acquires SSIDs 190, 192, and 194 from the first PC 82, the second PC 112 and the AP 64. That is, in the case 6, the multi-function device 10 does not acquire the SSID of the previously connected (detected disconnected) third PAN 120. The multi-function device 10 executes a determination process of determining whether or not wireless setting data including one of the SSIDs 190, 192, and 194 is registered to the PAN wireless setting data list 50. In S16 of FIG. 2 described above, the wireless setting data 142 including die SSID 190 of the first PAN 80 is registered to the PAN wireless setting data list 50. In S20 of FIG. 3 described above, the wireless setting data 156 including the SSID 192 of the second PAN 110 is registered to the PAN wireless setting data list 50. Accordingly, the multi-function device 10 determines that the result of the above-described determination is positive. Next, the multi-function device 10 specifies the wireless setting data 142 including the SSID 190 of the first PAN 80 and the wireless setting data 156 including the SSID 192 of the second PAN 110. However, the multi-function device 10 does not specify the wireless setting data 186 for the third PAN 120. The multi-function device 10 checks the time information 51b registered to the PAN wireless setting data list 50 in association with each of the wireless setting data 142 and 156. The multi-function device 10 reads the wireless setting data 156 associated with the latest time of the time information 51*b*, and stores the wireless setting data 156 in the wireless setup storage area 42. At this time, the multi-function device 10 updates the time information 51*b* registered to the PAN wireless setting data list 50 in association with the wireless setting data 156 to the time at which the wireless setting data 156 has been read. The multi-function device 10 performs communication 196 (communication of the above-described first and second signals) for trying to establish the reconnection to the second PAN 110 using the wireless setting data 156 stored in the wireless setup storage area 42. The multi-function device 10 attempts to establish the connection to the second PAN 110 using the wireless setting data 156 used immediately before the previous connection, that is, used for the previous connection. The multi-function device 10 is reconnected to the second PAN 110 (wireless communication 198).

(Reconnection Process by Multi-Function Device 10)

Figure 7:
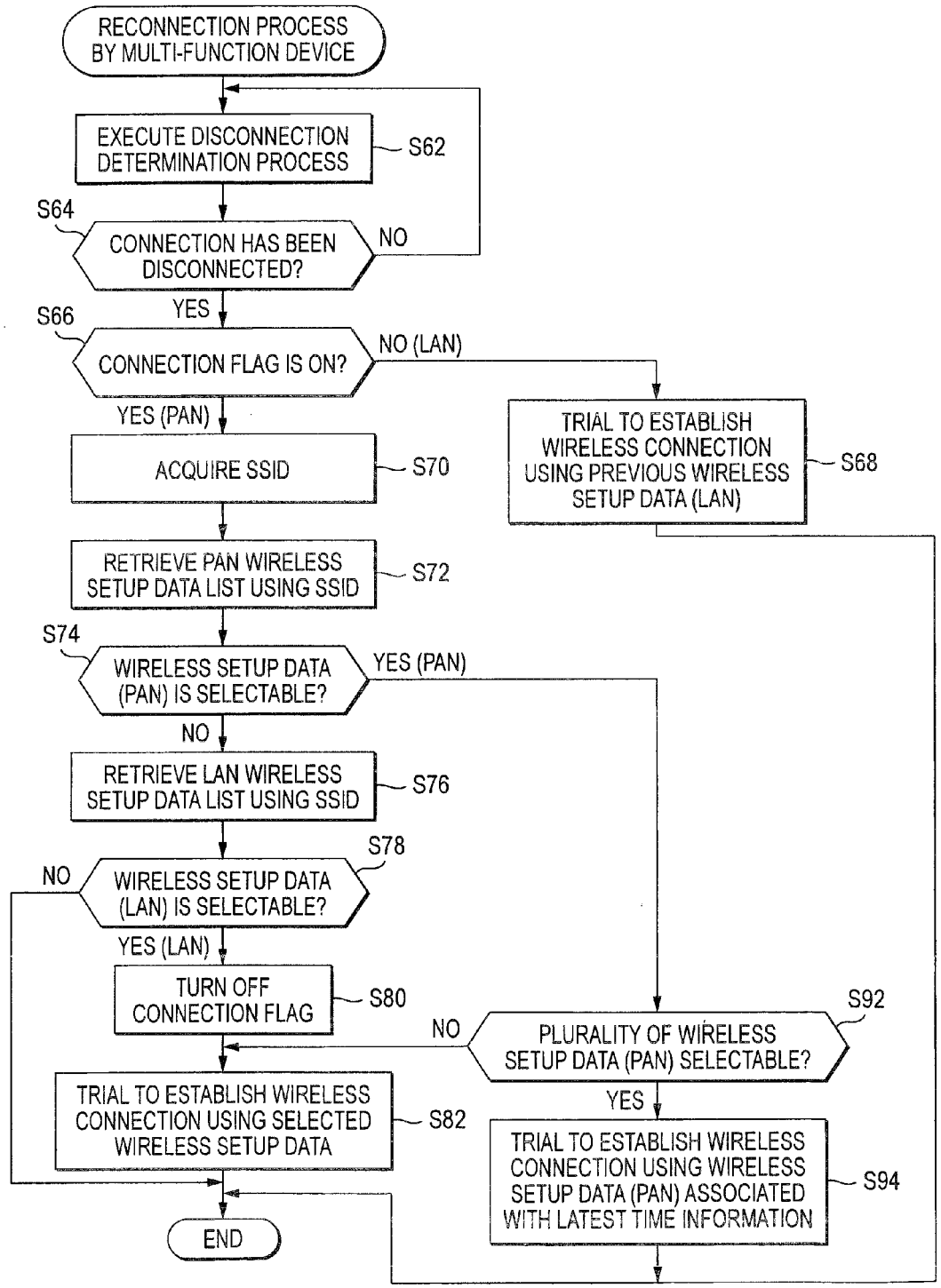
FIG. 7 shows a flowchart of a reconnection process to be executed by a multi-function device of the second embodiment.

Subsequently, a reconnection process to be executed by the multi-function device 10 will be described. As shown in FIG. 7, the sections 24, 26, 28, 30, and 32 of the multi-function device 10 execute the same process of S62 to S74 as that of the FIG. 5. In the case of NO in S74, the sections 24 and 28 end the process by executing the process of S76 to S82. On the other hand, in the case of YES in S74, the determination section 30 determines whether or not a plurality of wireless setting data can be selected (S92). For example, the case where the plurality of wireless setting data can be selected is the case where a plurality of SSIDs 174, 176, and 178 is acquired in S70 and a plurality of wireless setting data including one of the acquired SSIDs is registered to the PAN wireless setting data list 50 as shown in the case 5 of FIG. 6. In this case, the determination result is YES in S92. In the case of YES in S92, the trial section 28 reads the wireless setting data 156 corresponding to the latest time of the time information 51*b* corresponding to the plurality of wireless setting data specified in S92, and stores the wireless setting data in the wireless setup storage area 42. The trial section 28 updates the time information 51*b* registered to the PAN wireless setting data list 50 in association with the wireless setting data 156 to the time at which the wireless setting data 156 has been read. The trial section 28 ends the process by transmitting the above-described first signal to the first PC 82, the second PC 112, or the third PC 122 using wireless setting data stored in the wireless setup storage area 42 (S94). In the case of NO in S92, the process proceeds to S82.

The multi-function device 10 of the second embodiment can also have the same effect as the multi-function device 10 of the first embodiment.

In the second embodiment, the PAN wireless setting data list 50 is registered in association with the wireless setting data 50*c* and the time information 51*b*. When the plurality of wireless setting data has been specified (YES in S92 of FIG. 7), the trial section 28 performs reconnection attempt communication using wireless setting data corresponding to the latest time of the time information 51*b* corresponding to the plurality of wireless setting data (S94 of FIG. 7). According to this configuration, the multi-function device 10 can be connected to a newly connected wireless network among connectable wireless networks when the disconnection is detected and the reconnection to one of the wireless networks 60, 80, 110, and 120 is established In the case 5, the multi-function device 10 acquires the SSIDs 174 and 176 from the first PAN 80 and the second PAN 110 when the disconnection between the multi-function device 10 and the second PAN 110 is detected (S26 of FIG. 6). The wireless setting data 142 including the SSID of the first PAN 80 and the wireless setting data 156 including the SSID of the second PAN 110 are registered to the PAN wireless setting data list 50. The multi-function device 10 attempts to establish the reconnection to the detected disconnected second PAN 110 using the wireless setting data 156 for the previous connection from the wireless setting data 142 and 156 (the reconnection attempt communication 180 of FIG. 6).

In the case 6, the multi-function device 10 acquires the SSIDs 190 and 190 and 192 from the first PAN 80 and the second PAN 110, but does not acquire the SSID of the third PAN 120 when the disconnection between the multi-function device 10 and the third PAN 120 is detected (S30 of FIG. 6). That is, the multi-function device 10 specifies the wireless setting data 142 for the first PAN 80 and the wireless setting data 156 for the second PAN 110, but does not specify the wireless setting data 186 for the third PAN 120. In this case, the trial section 28 attempts to establish the reconnection to the second PAN 110 using the wireless setting data 156 for the newly connected (previously connected) second PAN 110 among the wireless setting data 142 and 156 (the reconnection attempt communication 196 of FIG. 6).

As is apparent from the above description, the LAN 60 of the embodiment corresponds to a first type of wireless network in the present invention, and each of the PANs 80, 110, and 120 corresponds to a second type of wireless network in the present invention. The multi-function device 10 of the embodiment corresponds to a wireless communication device in the present invention, and each of the PCs 82, 112, and 122 corresponds to a terminal device in the present invention. An SSID of the embodiment corresponds to an identifier in the present invention.

Specific examples of the present invention have been described above in detail, but they are only illustrative and do not limit the scope of the claims. Various changes and modifications in the specific examples illustrated above are included in the technique disclosed in the appended claims. Modified examples of the above-described embodiments are enumerated as follows.

(1) When an SSID is acquired in the above-described embodiment (S70 of FIGS. 5 and 7), the trial section 28 first determines whether or not wireless setting data including an SSID matching the acquired SSID is registered to the PAN wireless setting data list 50 (S72 of FIGS. 5 and 7). Alternatively, when the SSID is acquired, the multi-function device 10 may first determine whether or not the wireless setting data stored in the wireless setup storage area 42 includes the SSID matching the acquired SSID. When the wireless setting data of the wireless setup storage area 42 includes the acquired SSID, the attempt for the reconnection to the wireless network may be made using the wireless setting data of the wireless setup storage area 42. When the wireless setting data of the wireless setup storage area 42 does include the acquired SSID, it may be determined whether or not the Wireless setting data not including the acquired SSID is stored in the PAN wireless setting data list 50.

(2) When the communication section 24 acquires wireless setting data from each of the APs (the AP 64, the first PC 82, the second PC 112, and the third PC 122) included in the wireless network in the above-described embodiment, the wireless setting data is registered to one of the wireless setting data lists 38 and 50. Alternatively, a manger of the multi-function device 10 or the like may pre-register the wireless setting data to the wireless setting data lists 38 and 50 by operating the operation section 12.

(3) In the above-described embodiment, the determination section 30 determines that the multi-function device 10 is to be connected to a PAN (one of the PANs 80, 110, and 120)

when predetermined information indicating the correspondence to My WiFi Technology is included in a probe response, and determines that the multi-function device 10 is to be connected to the LAN 60 when the above-described predetermined information is not included. Alternatively, the determination section 30 may determine that the multi-function device 10 is to be connected to the LAN 60 when predetermined information indicating the LAN 60 is included in the probe response, and may determine that the multi-function device 10 is to be connected to the PAN (one of the PANs 80, 110, and 120) when the predetermined information indicating the LAN 60 is not included.

(4) In the above-described embodiment, a WPS push button system is used for automatic wireless setup. Alternatively, a WPS PIN code system may be used.

(5) In the above-described embodiment, the multi-function device 10 registers new wireless setting data without deleting other wireless setting data pre-registered when the other wireless setting data is pre-registered to the wireless setting data lists 38 and 50. Alternatively, the multi-function device 10 may register wireless setting data by deleting other wireless setting data (overwriting the wireless setting data on the other wireless setting data) when new wireless setting data is registered. Each of the wireless setup storage areas 36 and 48 may store only one of wireless setting data. In this case, the multi-function device 10 may perform communication for automatic wireless setup to acquire wireless setting data if the wireless setting data for the wireless network to be reconnected is not present in the wireless setup storage areas 36 or 48 when the reconnection to a wireless network (for example, the LAN 60 or the PAN 80, 110, or 120) connected once is established.

(6) In the above-described embodiment, WPS is used as a type automatic wireless setup mode. Alternatively, for example, the automatic wireless setup mode may be AOSS (registered trademark) (AirStation One-Touch Secure System) or SES (Secure Easy Setup).

(7) A technique of the above-described embodiment is applicable to other wireless communication devices such as a PC, a server, a printer, a scanner, a phone, and a facsimile as well as the multi-function device 10.

What is claimed is:

1. A wireless communication device communicable with a first type of wireless network including an access point and communicable with a second type of wireless network including a terminal device having an access point function, the wireless communication device comprising:
    a communication section configured to connect with a wireless network and executes communication with the wireless network;
    a detection section configured to detect a disconnection with the wireless network;
    a first storage configured to store first type wireless setting data for the first type of wireless network;
    a second storage configured to store second type wireless setting data for the second type of wireless network,
    wherein the communication section comprises:
        an obtaining section configured to obtain an identifier for identifying a wireless network from at least one of a certain access point and a certain terminal device, if the detection section detects the disconnection with a specified wireless network, and the specified wireless network is the second type of wireless network; and
        a trial section configured to,
            in a first case where the second storage stores at least one second type wireless setting data including an identifier that is identical with the obtained identifier, try to connect with the second type of wireless network including the certain terminal device with use of one of the at least one second type wireless setting data, and
            in a second case where the second storage does not store second type wireless setting data including an identifier that is identical with the obtained identifier but the first storage stores at least one first type wireless setting data including an identifier that is identical with the obtained identifier, try to connect with the first type of wireless network including the certain access point with use of one of the at least one first type wireless setting data, and
        a determination section configured to, if the detection section detects the disconnection with the specified wireless network, determine whether the specified wireless network is the first type of wireless network or the second type of wireless network,
    wherein
        the determination section determines that the specified network is the second type of wireless network, if a probe response signal, which is received when the wireless communication device previously connects with the specified wireless network, includes a predetermined information indicating the second type network; and
        the determination section determines that the specified network is the first type of wireless network, if the probe response signal, which is received when the wireless communication device previously connects with the specified wireless network, does not include the predetermined information.

2. The wireless communication device according to claim 1, the one of the at least one second type wireless setting data is used for the last connection precedent to the detected disconnection.

3. The wireless communication device according to claim 1, wherein
    the obtaining section obtains the identifier from each of the plurality of the terminal devices each including the certain terminal device; and
    if the second storage stores two or more second type wireless setting data and the two or more second type wireless setting data includes a specified second type wireless setting data used for the last connection precedent to the detected disconnection in the first case, the trial section selects the specified second type wireless setting data from the two or more of the second type wireless setting data and tries to connect the second type of wireless network, which is under the detected disconnection, with use of the selected specified second type wireless setting data.

4. The wireless communication device according to claim 1, wherein
    if the second storage does not store a specified second type wireless setting data used for the last connection precedent to the detected disconnection in the first case, the trial section tries to connect another second type of wireless network, which is different from the second type of wireless network under the detected disconnection, with use of another second type of wireless setting data stored in the second storage, wherein the another second type wireless setting data is used for a connection precedent to a connection which is precedent to the detected disconnection.

5. The wireless communication device according to claim 1, wherein if a disconnection with the first type of wireless network is detected, the trial section tries to reconnect the first type of wireless network, which is under the detected disconnection, with use of a specified first type of setting data, which is used for the last connection precedent to the detected disconnection.

6. The wireless communication device according to claim 1, wherein the first type wireless setting data includes an authentication system, an encryption system, and the identifier of the respective access points for the first type of wireless network, and the second type wireless setting data includes an authentication system, an encryption system, and the identifier of the respective terminal devices having the access point function for the second type of wireless network.

7. The wireless communication device according to claim 6, wherein the second storage stores a plurality of pairs of the second type wireless setting data and time information, and each pair of the second type wireless setting data and time information is stored in the second storage when the second type wireless setting data is used for the wireless connection.

8. The wireless communication device according to claim 7 wherein the time information of each pair in the second storage is updated when the second type wireless setting data corresponding to the time information is used for the connection.

9. A non-transitory computer-readable medium storing computer-readable instructions for connecting a wireless communication device to a wireless network, the wireless communication device communicable with a first type of wireless network including an access point and communicable with a second type of wireless network including a terminal device having an access point function, the wireless communication device including a first storage configured to store first type wireless setting data for the first type of wireless network and a second storage configured to store second type wireless setting data for the second type of wireless network, the computer-readable medium causing a computer to execute:
   detecting a disconnection of the wireless communication device with the wireless network;
   obtaining an identifier for identifying a wireless network from at least one of a certain access point and a certain terminal device, if the disconnection with a specified wireless network is detected, and the specified wireless network is the second type of wireless network;
   in a first case where the second storage stores at least one second type wireless setting data including an identifier that is identical with the obtained identifier, trying to connect with the second type of wireless network including the certain terminal device with use of one of the at least one second type wireless setting data, and
   in a second case where the second storage does not store second type wireless setting data including an identifier that is identical with the obtained identifier but the first storage stores at least one first type wireless setting data including an identifier that is identical with the obtained identifier, trying to connect with the first type of wireless network including the certain access point with use of one of the at least one first type wireless setting data, and
   determining, if the detection step detects the disconnection with the specified wireless network, whether the specified wireless network is the first type of wireless network or the second type of wireless network,
   wherein
   the determining step determines that the specified network is the second type of wireless network, if a probe response signal, which is received when the wireless communication device previously connects with the specified wireless network includes a predetermined information indicating the second type network; and
   the determining step determines that the specified network is the first type of wireless network, if the probe response signal, which is received when the wireless communication device previously connects with the specified wireless network, does not include the predetermined information.

10. A wireless communication device communicable with a first type of wireless network including an access point and communicable with a second type of wireless network including a terminal device having an access point function, the wireless communication device comprising:
   a communication section configured to connect with a wireless network and executes communication with the wireless network;
   a detection section configured to detect a disconnection with the wireless network;
   a first storage configured to store first type wireless setting data for the first type of wireless network; and
   a second storage configured to store second type wireless setting data for the second type of wireless network,
   wherein the communication section comprises:
      an obtaining section configured to obtain an identifier for identifying a wireless network from at least one of a certain access point and a certain terminal device, if the detection section detects the disconnection with a specified wireless network, and the specified wireless network is the second type of wireless network; and
      a trial section configured to,
      in a first case where the second storage stores at least one second type wireless setting data including an identifier that is identical with the obtained identifier, try to connect with the second type of wireless network including the certain terminal device with use of one of the at least one second type wireless setting data, and
   in a second case where the second storage does not store second type wireless setting data including an identifier that is identical with the obtained identifier but the first storage stores at least one first type wireless setting data including an identifier that is identical with the obtained identifier, try to connect with the first type of wireless network including the certain access point with use of one of the at least one first type wireless setting data,
   wherein,
      the obtaining section obtains the identifier from each of the plurality of the terminal devices each including the certain terminal device; and
      if the second storage stores two or more second type wireless setting data and the two or more second type wireless setting data includes a specified second type wireless setting data used for the last connection precedent to the detected disconnection in the first case, the trial section selects the specified second type wireless setting data from the two or more of the second type wireless setting data and tries to connect the second type of wireless network, which is under the detected disconnection, with use of the selected specified second type wireless setting data.

11. A wireless communication device communicable with a first type of wireless network including an access point and communicable with a second type of wireless network including a terminal device having an access point function, the wireless communication device comprising:
   a communication section configured to connect with a wireless network and executes communication with the wireless network;
   a detection section configured to detect a disconnection with the wireless network;
   a first storage configured to store first type wireless setting data for the first type of wireless network; and
   a second storage configured to store second type wireless setting data for the second type of wireless network, wherein the communication section comprises:
an obtaining section configured to obtain an identifier for identifying a wireless network from at least one of a certain access point and a certain terminal device, if the detection section detects the disconnection with a specified wireless network, and the specified wireless network is the second type of wireless network; and
a trial section configured to,
in a first case where the second storage stores at least one second type wireless setting data including an identifier that is identical with the obtained identifier, try to connect with the second type of wireless network including the certain terminal device with use of one of the at least one second type wireless setting data, and
in a second case where the second storage does not store second type wireless setting data including an identifier that is identical with the obtained identifier but the first storage stores at least one first type wireless setting data including an identifier that is identical with the obtained identifier, try to connect with the first type of wireless network including the certain access point with use of one of the at least one first type wireless setting data,
wherein,
if the second storage does not store a specified second type wireless setting data used for the last connection precedent to the detected disconnection in the first case, the trial section tries to connect another second type of wireless network, which is different from the second type of wireless network under the detected disconnection, with use of another second type of wireless setting data stored in the second storage, wherein the another second type wireless setting data is used for a connection precedent to a connection which is precedent to the detected disconnection.

12. A non-transitory computer-readable medium storing computer-readable instructions for connecting a wireless communication device to a wireless network, the wireless communication device communicable with a first type of wireless network including an access point and communicable with a second type of wireless network including a terminal device having an access point function, the wireless communication device including a first storage configured to store first type wireless setting data for the first type of wireless network and a second storage configured to store second type wireless setting data for the second type of wireless network, the computer-readable medium causing a computer to execute:
detecting a disconnection of the wireless communication device with the wireless network;
obtaining an identifier for identifying a wireless network from at least one of a certain access point and a certain terminal device, if the disconnection with a specified wireless network is detected, and the specified wireless network is the second type of wireless network; and
in a first case where the second storage stores at least one second type wireless setting data including an identifier that is identical with the obtained identifier, trying to connect with the second type of wireless network including the certain terminal device with use of one of the at least one second type wireless setting data, and
in a second case where the second storage does not store second type wireless setting data including an identifier that is identical with the obtained identifier but the first storage stores at least one first type wireless setting data including an identifier that is identical with the obtained identifier, trying to connect with the first type of wireless network including the certain access point with use of one of the at least one first type wireless setting data, and
obtaining the identifier from each of the plurality of the terminal devices each including the certain terminal device;
if the second storage stores two or more second type wireless setting data and the two or more second type wireless setting data includes a specified second type wireless setting data used for the last connection precedent to the detected disconnection in the first case, selecting the specified second type wireless setting data from the two or more of the second type wireless setting data and trying to connect the second type of wireless network, which is under the detected disconnection, with use of the selected specified second type wireless setting data.

13. A non-transitory computer-readable medium storing computer-readable instructions for connecting a wireless communication device to a wireless network, the wireless communication device communicable with a first type of wireless network including an access point and communicable with a second type of wireless network including a terminal device having an access point function, the wireless communication device including a first storage configured to store first type wireless setting data for the first type of wireless network and a second storage configured to store second type wireless setting data for the second type of wireless network, the computer-readable medium causing a computer to execute:
detecting a disconnection of the wireless communication device with the wireless network;
obtaining an identifier for identifying a wireless network from at least one of a certain access point and a certain terminal device, if the disconnection with a specified wireless network is detected, and the specified wireless network is the second type of wireless network; and
in a first case where the second storage stores at least one second type wireless setting data including an identifier that is identical with the obtained identifier, trying to connect with the second type of wireless network including the certain terminal device with use of one of the at least one second type wireless setting data, and
in a second case where the second storage does not store second type wireless setting data including an identifier that is identical with the obtained identifier but the first storage stores at least one first type wireless setting data including an identifier that is identical with the obtained identifier, trying to connect with the first type of wireless network including the certain access point with use of one of the at least one first type wireless setting data, wherein
if the second storage does not store a specified second type wireless setting data used for the last connection precedent to the detected disconnection in the first case, the trying to connect another second type of wireless network, which is different from the second type of wireless network under the detected disconnection, with use of another second type of wireless setting data stored in the second storage, wherein the another second type wireless setting data is used for a connection precedent to a connection which is precedent to the detected disconnection.

* * * * *